US008693121B1

(12) United States Patent
McNeill et al.

(10) Patent No.: US 8,693,121 B1
(45) Date of Patent: Apr. 8, 2014

(54) OVERSAMPLING STORAGE SYSTEM CAPTURED WAVEFORM

(71) Applicant: LSI Corporation, San Jose, CA (US)

(72) Inventors: Bruce W. McNeill, Yokohama (JP); Jason D. Byrne, Lyons, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/788,253

(22) Filed: Mar. 7, 2013

Related U.S. Application Data

(60) Provisional application No. 61/773,286, filed on Mar. 6, 2013.

(51) Int. Cl.
*G11B 5/09* (2006.01)
(52) U.S. Cl.
USPC ............... 360/39; 360/42; 360/43; 360/48; 360/55
(58) Field of Classification Search
None
See application file for complete search history.

(56) References Cited

U.S. PATENT DOCUMENTS 7,532,556 B2 * 5/2009 Noguchi et al. ............ 369/59.11
2003/0137765 A1 * 7/2003 Yamazaki et al. ............. 360/39

* cited by examiner

*Primary Examiner* — Muhammad N Edun
(74) *Attorney, Agent, or Firm* — Advent, LLP

(57) ABSTRACT

A method includes designating a first sampling phase for a signal captured from a magnetic storage medium, where the signal is representative of information stored by the magnetic storage medium. The method further includes capturing a first waveform associated with the signal at the first sampling phase. The method also includes designating a second sampling phase different from the first sampling phase for the signal. The method further includes capturing a second waveform associated with the signal at the second sampling phase. The method also includes interleaving the first waveform and the second waveform to form an oversampled waveform. The first waveform and the second waveform are captured at a rate at least substantially equal to a rate at which the information stored by the magnetic storage medium was written to the magnetic storage medium.

20 Claims, 11 Drawing Sheets

OVERSAMPLING STORAGE SYSTEM CAPTURED WAVEFORM

CROSS-REFERENCE TO RELATED APPLICATIONS

The present application claims the benefit under 35 U.S.C. §119(e) of U.S. Provisional Application Ser. No. 61/773,286, filed Mar. 6, 2013, and titled "OVERSAMPLING STORAGE SYSTEM CAPTURED WAVEFORM," which is herein incorporated by reference in its entirety.

FIELD OF THE INVENTION

The present disclosure is related to systems and techniques for oversampling a signal captured from a magnetic storage medium.

BACKGROUND

Generally, a hard-disk drive includes a rotating platter with a magnetic surface and a read/write head for reading data from and writing data to the magnetic surface. The read/write head is positioned relative to the magnetic surface using a servo mechanism and is controlled by circuitry for generating and detecting electromagnetic fields on the platter. To store data on the drive, write-channel circuitry encodes binary digital data received from a computing device into magnetic encodings, which are written onto the magnetic surface. To retrieve data from the drive, the servo mechanism first locates the appropriate position, and then read-channel circuitry detects and translates the magnetic encodings at that position into the binary digital data originally stored. Typically, The data on the platter is encoded using magnetic-flux reversals between two adjacent locations on the platter in a scheme known as "non-return-to-zero" (NRZ), where a bit having a value of '1' is stored on the disk as magnetization in one direction, and a bit having a value of '0' is stored as magnetization in the opposite direction. In a typical hard-disk drive, a variety of nonlinearities exist in the recording system, for which the read/write channel compensates. A dibit signal can be used to estimate a variety of non-linear parameters in a hard disk drive system. Such non-linear parameters include non-linear transition shifts, magneto-resistive asymmetry, channel linear density, overwrite, and so forth. These parameters are used for identifying the types and strengths of non-linear distortions present in the recording channel and developing approaches for mitigating these distortions.

SUMMARY

A method includes designating a first sampling phase for a signal captured from a magnetic storage medium, where the signal is representative of information stored by the magnetic storage medium. The method further includes capturing a first waveform associated with the signal at the first sampling phase. The method also includes designating a second sampling phase different from the first sampling phase for the signal. The method further includes capturing a second waveform associated with the signal at the second sampling phase. The method also includes interleaving the first waveform and the second waveform to form an oversampled waveform. The first waveform and the second waveform are captured at a rate at least substantially equal to a rate at which the information stored by the magnetic storage medium was written to the magnetic storage medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

Other embodiments of the disclosure will become apparent.

DETAILED DESCRIPTION

Figure 1:
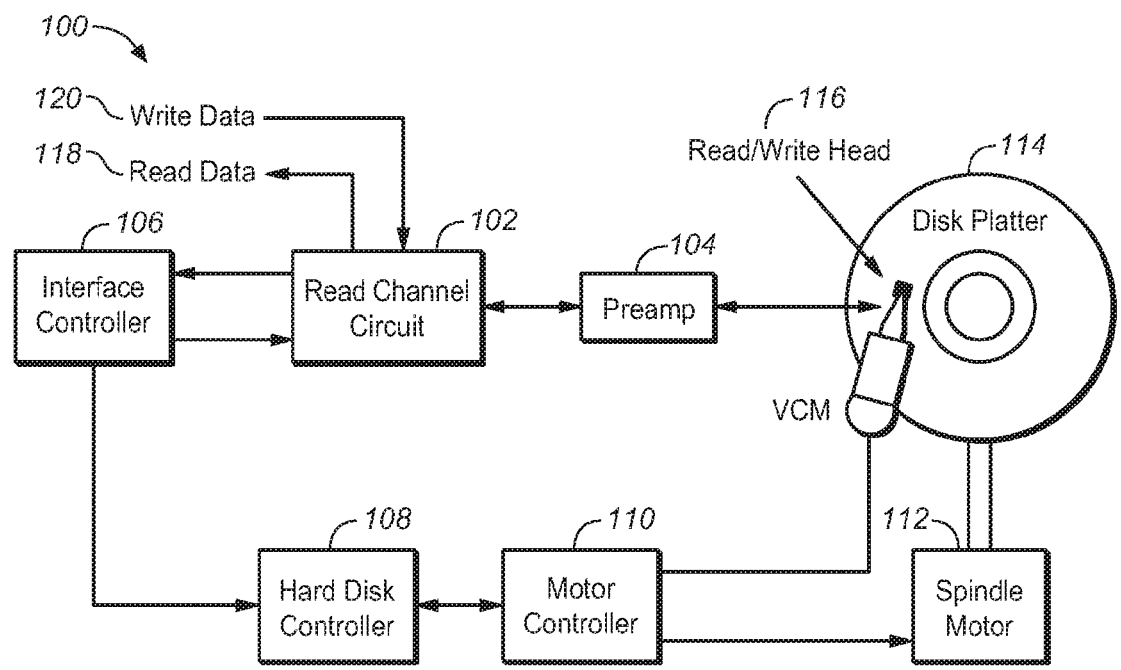
FIG. 1 is a block diagram illustrating a storage system including a read channel circuit in accordance with an example embodiment of the present disclosure.

In FIG. 1 a storage system 100 is illustrated. The storage system 100 includes a read channel circuit 102. In some embodiments, the storage system 100 is, for example, a hard disk drive (HDD). As shown, the storage system 100 includes a preamplifier 104, an interface controller 106, a hard disk controller 108, a motor controller 110, a spindle motor 112, a disk platter 114, and a read/write head assembly 116. The interface controller 106 controls addressing and timing of data to the disk platter 114 during a write operation and from the disk platter 114 during a read operation. The interface controller 106 also interacts with a host controller that includes out of order constraint command circuitry. The data on the disk platter 114 includes groups of magnetic signals that are detected by the read/write head assembly 116 when the assembly is properly positioned over disk platter 114. In embodiments of the disclosure the disk platter 114 includes magnetic signals recorded in accordance with either a longitudinal or a perpendicular recording scheme.

In a typical read operation, the read/write head assembly 116 is accurately positioned by the motor controller 110 adjacent a desired data track on the disk platter 114. In some embodiments, the read/write head assembly 116 is positioned using a voice coil motor actuator VCM. The motor controller 110 positions the read/write head assembly 116 in relation to the disk platter 114 and drives the spindle motor 112 by moving the read/write head assembly 116 to the proper data track on the disk platter 114 under the direction of the hard disk controller 108. The spindle motor 112 spins the disk platter 114 at a determined spin rate (e.g., at a determined number of revolutions per minute (RPM)). Once the read/write head assembly 116 is positioned adjacent to the proper data track, magnetic signals representing data on the disk platter 114 are sensed by the read/write head assembly 116 as the disk platter 114 is rotated by the spindle motor 112. The sensed magnetic signals are provided as a continuous, minute analog signal representative of the magnetic data on the disk platter 114. This minute analog signal is transferred from the read/write head assembly 116 to the read channel circuit 102 via a preamplifier 104. The preamplifier 104 is operable to amplify the minute analog signals accessed from the disk platter 114. In turn, the read channel circuit 102 decodes and digitizes the received analog signal to recreate the information originally written to the disk platter 114. This data is provided as read data 118 to a receiving circuit. A write operation is substantially the opposite of the preceding read operation with write data 120 being provided to the read channel circuit 102. This data is then encoded and written to the disk platter 114.

As part of processing the received information, read channel circuit 102 applies a data detection algorithm to the received data set to yield a detected output. In some embodiments, the read channel circuit is implemented similar to that discussed in relation to FIGS. 2 through 4 and/or operates similar to the methods discussed below in relation to FIG. 11.

In embodiments of the disclosure, a data decoder circuit used in relation to read channel circuit 102 comprises, but is not necessarily limited to, a partial response maximum likelihood (PRML) decoder circuit. Partial response maximum likelihood technology is applicable to transmission of information over various channels and/or information storage systems on various media. Transmission applications include, but are not necessarily limited to: optical fiber, radio frequency channels, wired or wireless local area networks, digital subscriber line technologies, wireless cellular, Ethernet over various mediums such as copper or optical fiber, cable channels such as cable television, and Earth-satellite communications. Storage applications include, but are not necessarily limited to: hard disk drives, compact disks, digital video disks, magnetic tapes and memory devices such as DRAM, NAND flash, NOR flash, other nonvolatile memories and solid state drives.

In addition, it should be noted that in some embodiments, the storage system 100 is configured to include solid state memory to store data in addition to the storage offered by the disk platter 114. In embodiments of the disclosure, solid state memory is used in parallel to the disk platter 114 to provide additional storage. The solid state memory receives and provides information directly to the read channel circuit 102. Additionally, in some embodiments the solid state memory is used as a cache, e.g., to provide faster access time than that offered by the disk platter 114. In some embodiments, the solid state memory is disposed between the interface controller 106 and the read channel circuit 102 and operates as a pass through to the disk platter 114, e.g., when requested data is not available in the solid state memory or when the solid state memory does not have sufficient storage to hold a newly written data set. A variety of storage systems including disk platter 114 and solid state memory are furnished in embodiments of the disclosure.

The hard disk controller 108 for storage system 100, including some or all of its components, can operate under computer control. For example, a processor can be included with or in a hard disk controller 108 to control the components and functions of storage systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the storage systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A processor provides processing functionality for the hard disk controller 108 and can include any number of processors, micro-controllers, or other processing systems, and resident or external memory for storing data and other information accessed or generated by the storage system 100. The processor can execute one or more software programs that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The hard disk controller 108 includes a communications interface. The communications interface is operatively configured to communicate with components of the storage system 100. For example, the communications interface can be configured to transmit data for storage in the storage system 100, retrieve data from storage in the storage system 100, and so forth. The communications interface is also communicatively coupled with the processor to facilitate data transfer between components of the storage system 100 and the processor (e.g., for communicating inputs to the processor received from a device communicatively coupled with the storage system 100). It should be noted that while the communications interface is described as a component of a storage system 100, one or more components of the communications interface can be implemented as external components communicatively coupled to the storage system 100 via a wired and/or wireless connection.

The communications interface and/or the processor can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface can be configured to communicate with a single network or multiple networks across different access points.

The hard disk controller 108 also includes a memory. The memory is an example of tangible, computer-readable storage medium that provides storage functionality to store various data associated with operation of the hard disk controller 108, such as software programs and/or code segments, or other data to instruct the processor, and possibly other components of the hard disk controller 108, to perform the functionality described herein. Thus, the memory can store data, such as a program of instructions for operating the hard disk controller 108 (including its components), and so forth. It should be noted that while a single memory is described, a wide variety of types and combinations of memory (e.g., tangible, non-transitory memory) can be employed. The memory can be integral with the processor, can comprise stand-alone memory, or can be a combination of both. The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth.

Figure 2:
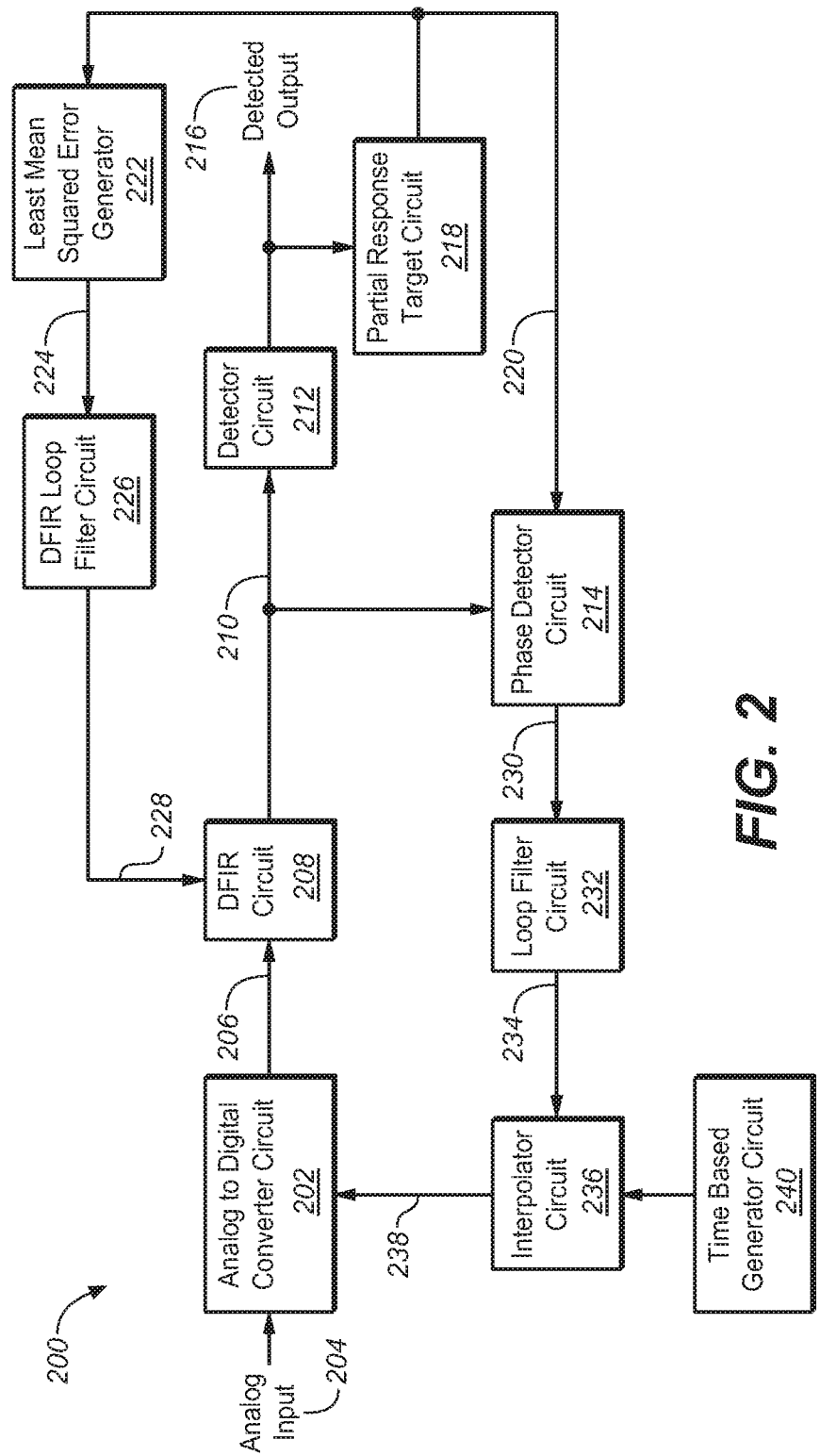
FIG. 2 is a block diagram illustrating a timing recovery loop circuit for a read channel circuit, such as the read channel circuit of the storage system illustrated in FIG. 1, in accordance with an example embodiment of the present disclosure.

Referring now to FIG. 2, a timing recovery loop circuit 200 for a read channel circuit, such as the read channel circuit 102 of storage system 100 described in FIG. 1, is depicted. The timing recovery loop circuit 200 includes an analog to digital converter circuit 202 that converts an analog input signal 204 into a series of digital samples 206 that are provided to a digital finite impulse response (DFIR) filter 208. The DFIR filter 208 filters the received input and provides a corresponding filtered output 210 to both a detector circuit 212 and a phase detector circuit 214. The detector circuit 212 performs a data detection process on the received input resulting in a detected output 216. In performing the detection process, the detector circuit 212 attempts to correct any errors in the received data input.

The detected output 216 is provided to a partial response target circuit 218 that creates a partial response output 220 compatible with the filtered output 210. The detected output 216 is also provided to a least mean squared error generator circuit 222 that provides an error output 224 to a DFIR loop filter circuit 226. It should be noted that the least mean squared error generator circuit 222 is provided by way of example only and is not meant to be restrictive of the present disclosure. Thus, other types of error generator circuits can be used in accordance with the present disclosure. For example, in some embodiments a zero forcing error generator circuit or a hybrid zero forcing error generator circuit and least mean squared error generator circuit are used in place of the least mean squared error generator circuit 222. The DFIR loop filter circuit 226 provides a filtered output 228 (i.e., filter taps) to the DFIR filter 208. The operation of the DIM filter 208 is governed at least in part by the filtered output 228.

The phase detector circuit 214 determines a phase difference between the partial response output 220 and the filtered output 210 and yields a phase error output 230. When the timing recovery loop circuit 200 is synchronized to the analog input signal 204, the phase error output 230 goes to zero. The phase error output 230 is provided to a loop filter circuit 232 that filters the received input and provides a corresponding filtered output 234. The filtered output 234 is provided to an interpolator circuit 236 that is operable to determine an optimal sampling phase/frequency for a sampling clock 238. The sampling clock 238 is based on a clock input provided by a time based generator circuit 240. The next instance of the analog input signal 204 is sampled by the analog to digital converter circuit 202 synchronous to the sampling clock 238.

Figure 3:
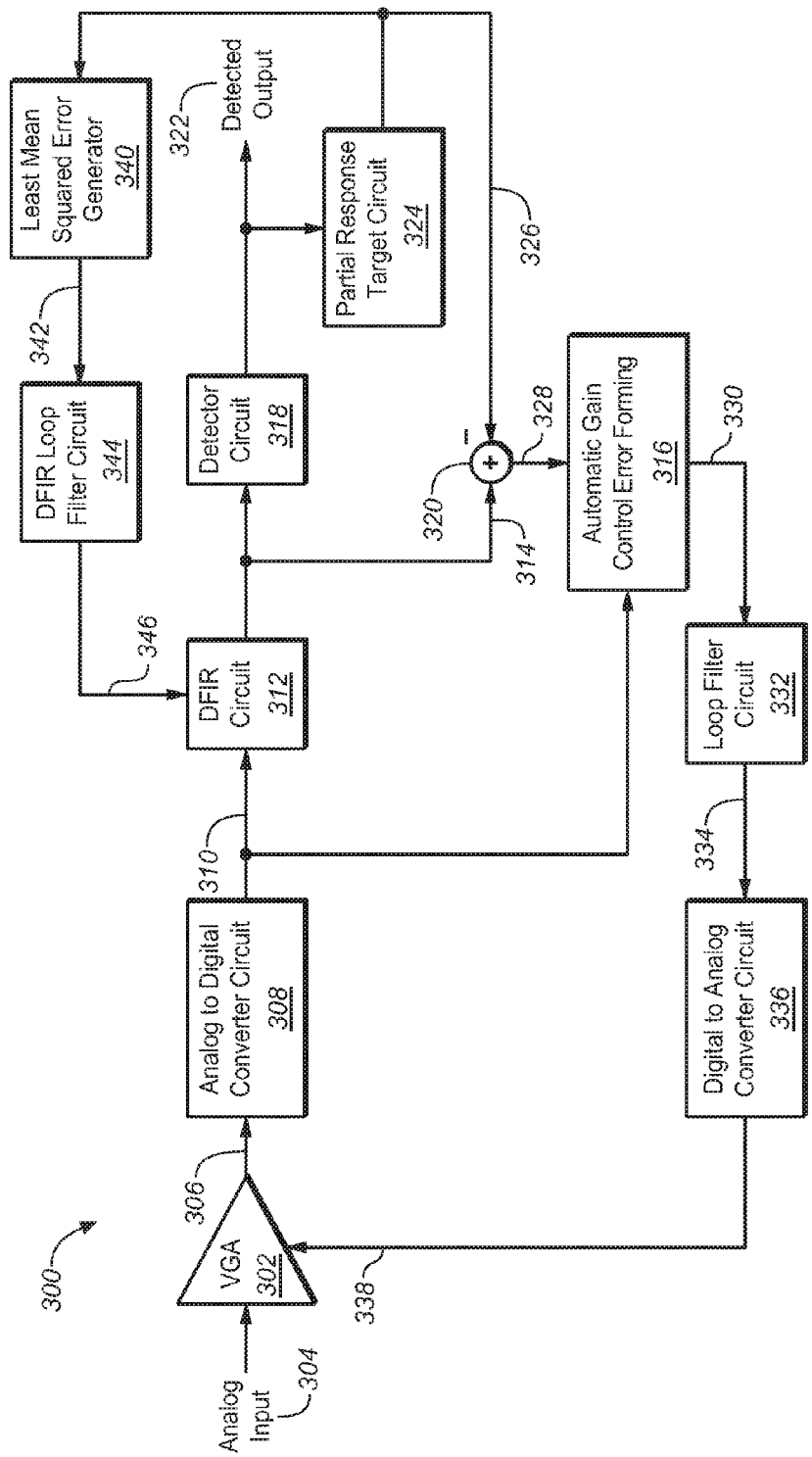
FIG. 3 is a block diagram illustrating an automatic gain control loop circuit for a read channel circuit, such as the read channel circuit of the storage system illustrated in FIG. 1, in accordance with an example embodiment of the present disclosure.

Referring to FIG. 3, an automatic gain control loop circuit 300 for a read channel circuit, such as the read channel circuit 102 of storage system 100 described in FIG. 1, is depicted. The automatic gain control loop circuit 300 includes a variable gain amplifier 302 that receives an analog input signal 304. The variable gain amplifier 302 amplifies the analog input signal 304 to yield an amplified output 306 that is provided to an analog to digital converter circuit 308. The analog to digital converter circuit 308 converts the received signal into a series of digital samples 310 that are provided to a DIM circuit 312. The DFIR circuit 312 filters the received input and provides a corresponding filtered output 314. In addition, the digital samples 310 are provided to an automatic gain control error forming circuit 316.

The filtered output 314 is provided to both a detector circuit 318 and a summation circuit 320. The detector circuit 318 performs a data detection process on the received input resulting in a detected output 322. In performing the detection process, the detector circuit 318 attempts to correct errors in the received data input. The detected output 322 is provided to a partial response target circuit 324 that creates a partial response output 326 compatible with the filtered output 314. The summation circuit 320 subtracts the partial response output 326 from the filtered output 314 to yield an error value 328. The error value 328 is provided to the automatic gain control error forming circuit 316 where it is used to modify digital samples to yield an error feedback signal 330. The error feedback signal 330 is provided to a loop filter circuit 332 that filters the received input and provides a filtered output 334 to a digital to analog converter circuit 336. The digital to analog converter circuit 336 converts the received input to a feedback signal 338. The feedback signal 338 governs the level of amplification applied by the variable gain amplifier 302.

The detected output 322 is also provided to a least mean squared error generator circuit 340 that provides an error output 342 to a DM loop filter circuit 344. It should be noted that the least mean squared error generator circuit 340 is provided by way of example only and is not meant to be restrictive of the present disclosure. Thus, other types of error generator circuits can be used in accordance with the present disclosure. For example, in some embodiments a zero forcing error generator circuit or a hybrid zero forcing error generator circuit and least mean squared error generator circuit are used in place of the least mean squared error generator circuit 340. The DFIR loop filter circuit 344 provides a filtered output 346 (i.e., filter taps) to the DFIR circuit 312. The operation of the DFIR circuit 312 is governed at least in part by the filtered output 346.

Figure 4:
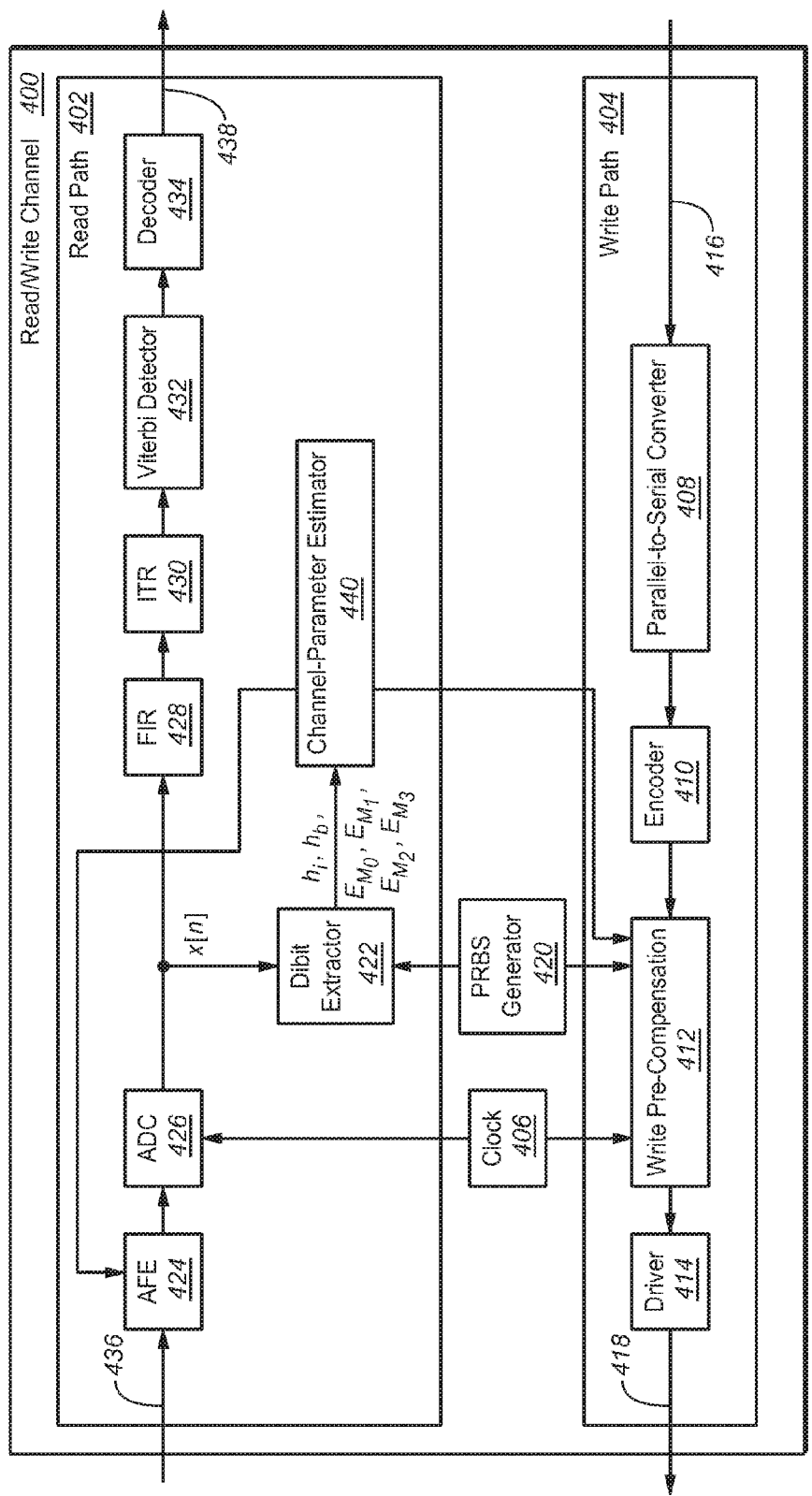
FIG. 4 is a block diagram illustrating a read/write channel for a storage system, such as the storage system illustrated in FIG. 1, in accordance with an example embodiment of the present disclosure.

Referring now to FIG. 4, a read/write channel 400 for a storage system, such as storage system 100 described in FIG. 1, is depicted. In this embodiment, read/write channel 400 is implemented as an integrated circuit using a complementary metal oxide semiconductor (CMOS) process for transistors, although it is should be noted that other process technologies may be used, and that the circuitry disclosed herein can be integrated with other circuitry included in a system, such as the hard disk controller 108 of storage system 100 of FIG. 1. Read/write channel 400 converts between binary digital information and analog signals corresponding to magnetic flux on magnetic media (e.g., disk platter 114 of FIG. 1). Read/write channel 400 includes a read path 402, a write path 404, and a dock 406. The clock 406 provides timing signals for controlling logic operations to the read path 402 and the write path 404. In embodiments of the disclosure, the read/write channel 400 implements dibit extraction, a technique for analyzing a dibit response to identify and examine nonlinear distortion effects.

A research paper containing background information concerning such nonlinearities is Palmer et al. "Identification of Nonlinear Write Effects Using Pseudorandom Sequences," *IEEE Transactions on Magnetics*, Vol. Mag-23, No. 5, September 1987, pp 2377-2379, which is incorporated herein by reference in its entirety, and which discusses linear and nonlinear distortions that occur in read channels and describes a technique for separating linear and nonlinear effects, based on the unique properties of a maximal-length pseudorandom bit sequence (PRBS; also referred to as an "m-sequence"). Palmer et al, describe dibit extraction for analyzing dibit response (i.e. the response of a read head to an isolated NRZ bit) to identify and examine nonlinear distortion effects.

Dibit extraction is based on writing and then reading an integer number of periods of a maximal-length PRBS sequence and extracting a dibit response from the playback voltage V(t), where the NRZ data bits are deconvolved from the playback data (i.e. process of determining the system transfer function or impulse response from measured outputs of the system and information on the input) to obtain the digit response. It should be noted that for the purposes of the present disclosure, the term "dibit" is used to refer both to the dibit itself and to the dibit response.

If the dibit response is accurate, then proper compensation for nonlinearities in the read channel can be made, e.g., by adjusting the signal as it is being written to disk by using write pre-compensation or by estimating channel pulse-width parameters to improve read operations. The extracted dibit contains information about several types of nonlinear distortions. One type of nonlinear distortion is a nonlinear transition shift (NLTS), which involves two transitions written closely enough that the demagnetizing fields from the previous transitions affect the timing of the writing of the next transition. Another type of nonlinear distortion is a hard transition shift (HTS), which involves reversing the direction of magnetization in already magnetized areas. Other types of nonlinear distortions include, but are not necessarily limited to partial erasure, magneto-resistive head asymmetry (MRA), and overwrite (OW). Either the extracted dibit itself or certain metrics computed using the extracted dibit can be used to adapt recording channel parameters to minimize such nonlinearities.

in a typical application, a maximal-length PRBS sequence (e.g., a 127-hit PRBS sequence) is written to disk and then read back to obtain a playback voltage V(t). If $a_k$ is a bit in a maximal-length NRZ PRBS sequence, then nonlinear effects are associated with various products of the bits. For example, MRA is associated with $a_k a_{k-1}$, and NLTS is associated with $a_{k-1} a_k a_{k+1}$. Based on the "shift and add" property of maximal-length PRBS sequences (in which the modulo-2 addition of any two identical PRBS sequences with different phases generates another identical PRBS sequence, but with another phase), the nonlinear NRZ bit products produce echoes in the extracted dibit.

The write path 404 includes a parallel-to-serial converter 408, an encoder 410, a write pre-compensation circuit 412, and a driver circuit 414. The parallel-to-serial converter 408 receives, through an interface 416, eight bits of data at a time from a controller (e.g., hard disk controller 108 of FIG. 1) and generates, from the parallel input data, a serial bit stream, which is provided to the encoder 410. The encoder 410 encodes, e.g., using a run-length limited (RLL) algorithm, the serial bit stream into symbolic binary sequences for recording on magnetic media (e.g., disk platter 114 of FIG. 1) and provides the encoded sequences to the write pre-compensation circuit 412. The write pre-compensation circuit 412 dynamically adjusts the pulse widths of the bit stream to account for magnetic distortions in the recording process and provides the adjusted signal to the driver circuit 414. The driver circuit 414, through an interface 418, drives the adjusted signal to a write amplifier (e.g., preamplifier 104 of FIG. 1), which drives a read/write head (e.g., read/write head 116 of FIG. 1) to record the data on magnetic media (e.g., disk platter 114 of FIG. 1).

A PRBS generator 420 provides a PRBS sequence to the write pre-compensation circuit 412 in the write path 404, so that the PRBS sequence can be written to disk. The PRBS generator 420 provides the same PRBS sequence to a dibit extractor 422 in the read path 402, which reads the PRBS sequence previously written to the disk for the purpose of extracting a dibit response, as will be described in further detail below. In embodiments, the PRBS generator 420 is used only when dibit extraction is desired and not during normal read/write operations.

The read path 402 includes an analog front-end (AFE) 424, an analog-to-digital converter (ADC) 426, a finite impulse-response (FIR) filter 428, an interpolated-timing recovery (ITR) circuit 430, a Viterbi-algorithm detector 432, and a decoder 434. The read/write channel 400 receives, through an interface 436, amplified magnetic signals sensed from magnetic media (e.g., disk platter 114 of FIG. 1) by a read/write head (e.g., read/write head 116 of FIG. 1). An analog waveform corresponding to the amplified magnetic signals is first provided to AFE 424, which processes the analog waveform to a desired pulse amplitude and bandwidth for conversion to a digital signal.

The AFE 424 provides the processed analog signal to the ADC 426, which samples the analog signal and converts it to a digital signal by generating a time-sequenced binary signal associated with amplitude samples of the analog signal. The ADC 426 provides the sampled digital signal to the FIR filter 428 (e.g., a 10-tap FIR filter), which equalizes the samples of the digital signal according to a desired pulse response. The FIR filter 428 provides the equalized signal to the ITR circuit 430, which adjusts the sample timing of the digital signal to compensate for timing disturbances present in the signal samples. The timing of the ITR circuit 430 can be controlled, e.g., by a phase-locked loop (PLL) (not shown).

The ITR circuit 430 provides the synchronized digital signal to the Viterbi-algorithm detector 432, which uses digital-signal processing (DSP) techniques to determine the binary bit pattern represented by the digital signal. The Viterbi-algorithm detector 432 provides the binary data represented by the digital signal to the decoder 434, which removes the parity hit from the binary bit pattern and performs decoding (e.g., RLL decoding) of the encoded symbols into the actual binary data. The decoder 434 provides the actual binary data, through an interface 438, to a controller (e.g., hard disk controller 108 of FIG. 1).

The read path 402 also includes the dibit extractor 422 and a channel-parameter estimator 440. The dibit extractor 422 receives samples from the ADC 426 and a PRBS sequence from the PRBS generator 420 and performs a correlation between the samples and a known PRBS sequence previously written to magnetic media. This correlation is done with specific delays between the samples and the data bits of the PRBS sequence that correspond to echoes caused by nonlinear distortions and results in the identification of one or more echo points. The dibit extractor 422 further determines a bit response $h_b$ and computes an impulse response $h_i$ using the extracted dibit. The dibit extractor 422 provides one or more of: the extracted echo points (e.g., in the form of amplitudes $E_{M_0}$, $E_{M_1}$, $E_{M_2}$, and $E_{M_3}$ of echoes at positions $M_0$, $M_1$, $M_2$, and $M_3$, respectively), the bit response $h_b$, and the computed impulse response $h_i$ to the channel-parameter estimator 440, which uses this information to compute channel parameters, e.g., NLTS, HTS, MRA, and channel-bit density (CBD). In some embodiments, the channel-parameter estimator 440 provides one or more of the computed channel parameters to one or more other blocks in the read path 402 or the write path 404 (e.g., to adjust write pre-compensation). In embodiments of the disclosure, the computed channel parameters are provided to AFE 424 and write pre-compensation circuit 412.

Figure 11:
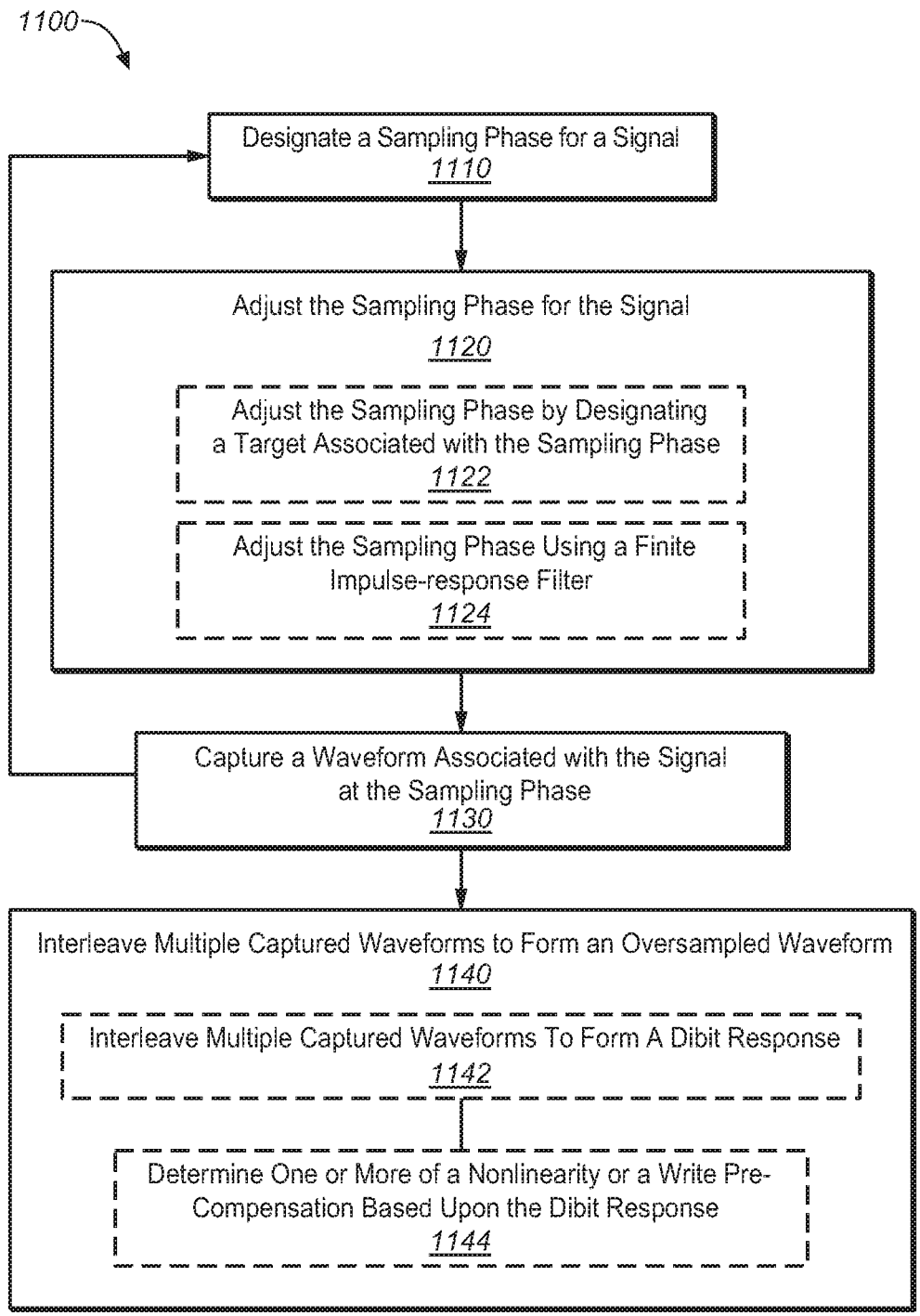
FIG. 11 is a flow diagram illustrating a method for oversampling a signal, such as an input waveform captured from a magnetic storage system, in accordance with example embodiments of the present disclosure.

Referring now to FIG. 11, example techniques are described for oversampling a signal. FIG. 11 depicts a process 1100, in an example embodiment, for oversampling a signal, such as an input waveform captured from storage system 100 illustrated in FIG. 1 and described above.

In the process 1100 illustrated, a first sampling phase for a signal to be captured from a magnetic storage medium is designated (Block 1110). For example, with reference to FIGS. 1 through 10, read channel circuit 102, timing recovery loop circuit 200, automatic gain control loop circuit 300, or read/write channel 400 are configured to receive an input waveform. In the example shown in FIG. 1, preamplifier 104 is configured to receive an input waveform. In embodiments of the disclosure, a first sampling phase for the input waveform is designated. For example, with continuing reference to FIGS. 1 through 10, read channel circuit 102, timing recovery loop circuit 200, automatic, gain control loop circuit 300, or read/write channel 400 designates a sampling phase for the signal to be received from, e.g., preamplifier 104.

Next, the sampling phase for the signal is adjusted (Block 1120). In some embodiments, the sampling phase is adjusted by designating a target associated with the sampling phase (Block 1122). In embodiments of the disclosure, the input waveform is sampled at the rate of a read synthesizer clock, Tr. A Digital Phase-Locked Loop (DPLL) is used to adjust the sample phase of the input waveform based upon the target. Waveforms from multiple targets are captured. For instance, waveforms of two (2) targets, three (3) targets, or more than three (3) targets (e.g., twenty (20) targets, forty (40) targets, and so forth) are captured. However, these numbers of targets are provided by way of example only and are not meant to be restrictive of the present disclosure. Thus, in other embodiments, different numbers of targets are designated and waveforms from the targets are captured. In some embodiments of the disclosure, the multiple targets are roughly or at least substantially equally spaced apart (e.g., at Tr/20). However, twenty (20) roughly or at least substantially equally spaced targets are provided by way of example only and are not meant to be restrictive of the present disclosure. For example, in other embodiments, forty (40) roughly or at least substantially equally spaced targets are designated (e.g., at Tr/40).

In some embodiments, targets are used to designate the sampling phase of the captured waveform as shown in Table 1, where the targets range from a −Tr/2 sampling phase at [0, 10, 10] (relative to the center of a written bit) to a +Tr/2 sampling phase at [10, 10, 0] with the sampling phases evenly spaced across the bit interval. Then, signal amplitude and phase for a target can be estimated using a root-mean-square (RMS) voltage calculation for a PRBS sequence as follows:

$$\Delta T = \frac{3T0 + 2T1 + T2}{T0 + T1 + T2} - 2$$

$$\text{RMS} = \sqrt{(T0^2 + T1^2 + T2^2) - 2(T0T1 + T1T2 + T2T0)/127} \cong \sqrt{T0^2 + T1^2 + T2^2}$$

However, an RMS voltage calculation is provided by way of example only and is not meant to limit the present disclosure. In other embodiments, the signal amplitude can be calculated using a peak-to-peak voltage calculation for a PBRS sequence as follows:

peak-to-peak=|T0|+|T1|+|T2|

TABLE 1

Multiple Targets Equally Spaced.

| TARGETs | Time |
|---|---|
| [10, 10, 0] | +0.500 T |
| [9, 11, 0] | +0.450 T |
| [8, 12, 0] | +0.400 T |
| [8, 12, 1] | +0.333 T |
| [7, 13, 1] | +0.286 T |
| [7, 13, 2] | +0.227 T |
| [6, 14, 2] | +0.182 T |
| [5, 14, 2] | +0.143 T |
| [5, 14, 3] | +0.091 T |
| [5, 14, 4] | +0.044 T |
| [4, 14, 4] | 0.0 T |
| [4, 14, 5] | −0.044 T |
| [3, 14, 5] | −0.091 T |
| [2, 14, 5] | −0.143 T |
| [2, 14, 6] | −0.182 T |
| [2, 13, 7] | −0.227 T |
| [1, 13, 7] | −0.286 T |
| [1, 12, 8] | −0.333 T |
| [0, 12, 8] | −0.400 T |
| [0, 11, 9] | −0.450 T |
| [0, 10, 10] | −0.500 T |

In other embodiments of the disclosure, the sampling phase is adjusted using a finite impulse-response filter (Block 1124). For example, with continuing reference to FIGS. 1 through 10, DFIR filter 208, DFIR circuit 312, or FIR filter 428 receives a signal and adjusts the sampling phase of the signal. For instance, the DPLL is used to adjust the sample phase of the input waveform based upon the DM settings. In the present example, the feedback loop described with reference to FIG. 2 that includes the least mean squared error generator circuit 222 and the DFIR loop filter circuit 226 is disabled, and the update gain for the DFIR filter 208 is set to zero (0) while the DFIR filter 208 is programmed as described. In still further embodiments, the sampling phase is adjusted by designating a target associated with the sampling phase (Block 1122) and using a finite impulse-response filter (Block 1124) in combination. For example, twenty (20) roughly or at least substantially equally spaced targets are combined with a DFIR setting configured to shift the phase of a waveform by Tr/40 to increase the resolution of the captured waveform to Tr/40 roughly or at least substantially equally spaced sampling phases. For example, the targets shown in Table 1 change the sample spacing of the received waveform in steps of approximately Tr/20 spacing, and a finite-impulse response filter is used to shift the sample phases in steps of approximately Tr/128 for finer resolution spacing. However, this configuration is provided by way of example only and is not meant to be restrictive of the present disclosure. Thus, in other implementations different spacing can be used for targets and/or for a finite impulse-response filter.

Then, a waveform associated with the signal is captured at the sampling phase (Block 1130). In embodiments of the disclosure, the input waveform is sampled using, for instance, an analog-to-digital converter. For example, with continuing reference to FIGS. 1 through 10, analog input signal 204 is sampled by analog to digital converter circuit 202, analog input signal 304 is sampled by analog to digital converter circuit 308, or an analog waveform provided to AFE 424 is sampled by ADC 426. In embodiments of the disclosure, the signal is sampled two or more times in series while the sampling phase is adjusted on separate captures of the same waveform. For instance, the signal is sampled two-times (2×), three-times (3×), or more than three-times (e.g., twenty-times (20×), forty-times (40×), and so forth). However, these numbers of samples are provided by way of example only and are not meant to be restrictive of the present disclosure. Thus, in other embodiments, the signal is sampled a different number of times. In some embodiments, the automatic gain control loop circuit 300 described with reference to FIG. 3 is disabled while the waveform is captured (e.g., to hold the gain of VGA 302 constant). In other embodiments, the automatic gain control loop circuit 300 described with reference to FIG. 3 is not disabled while the waveform is captured.

With continuing reference to FIG. 11, process 1100 proceeds to designate a second sampling phase different from the first sampling phase for the signal (Block 1110). For example, with continuing reference to FIGS. 1 through 10, read channel circuit 102, timing recovery loop circuit 200, automatic gain control loop circuit 300, or read/write channel 400 designates a second sampling phase for the signal received from, e.g., preamplifier 104. Next, the second sampling phase is adjusted for the signal (Block 1120). In embodiments of the disclosure, adjusting the second sampling phase for the signal is performed by designating a second target associated with the sampling phase (Block 1122) and/or using a finite impulse-response filter (Block 1124), e.g., as previously described. Then, a second waveform associated with the signal is captured at the second sampling phase (Block 1130). In embodiments of the disclosure, the first waveform and the second waveform are captured at a rate at least substantially equal to a rate at which the information stored by the magnetic storage medium was written to the magnetic storage medium.

Figure 5:
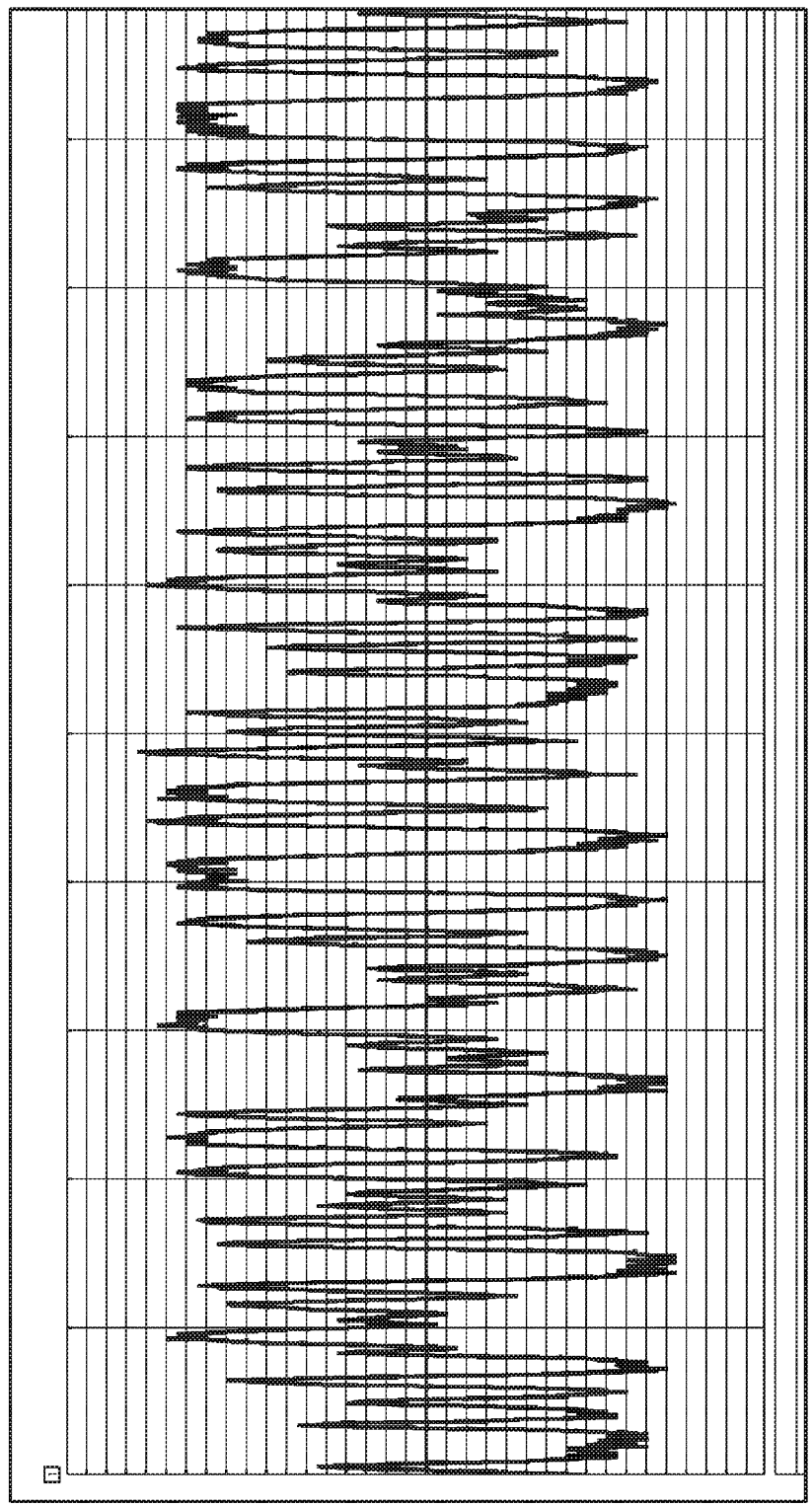
FIG. 5 is a graph illustrating the output from an analog to digital converter of a storage system, such as the storage system illustrated in FIG. 1, captured with twenty-times (20×) oversampling using multiple targets in accordance with an example embodiment of the present disclosure.

Process 1100 proceeds to designate a third sampling phase different from the first sampling phase and the second sampling phase for the signal (Block 1110), adjust the third sampling phase for the signal (Block 1120), capture a third waveform associated with the signal at the third sampling phase (Block 1130), and so forth (e.g., until all of the multiple designated sampling phases have been sampled). Next, the multiple captured waveforms are interleaved to form an oversampled waveform (Block 1140). For example, twenty waveforms spaced apart at Tr/20 are combined to form an interleaved waveform (e.g., as shown in FIG. 5). In some embodiments, the oversampled input waveform is used for error recovery. For example, measuring the signal at different sampling phases and/or measuring the signal multiple times as described herein may be used to decrease the signal-to-noise ratio (SNR) of the captured waveform.

Figure 6:
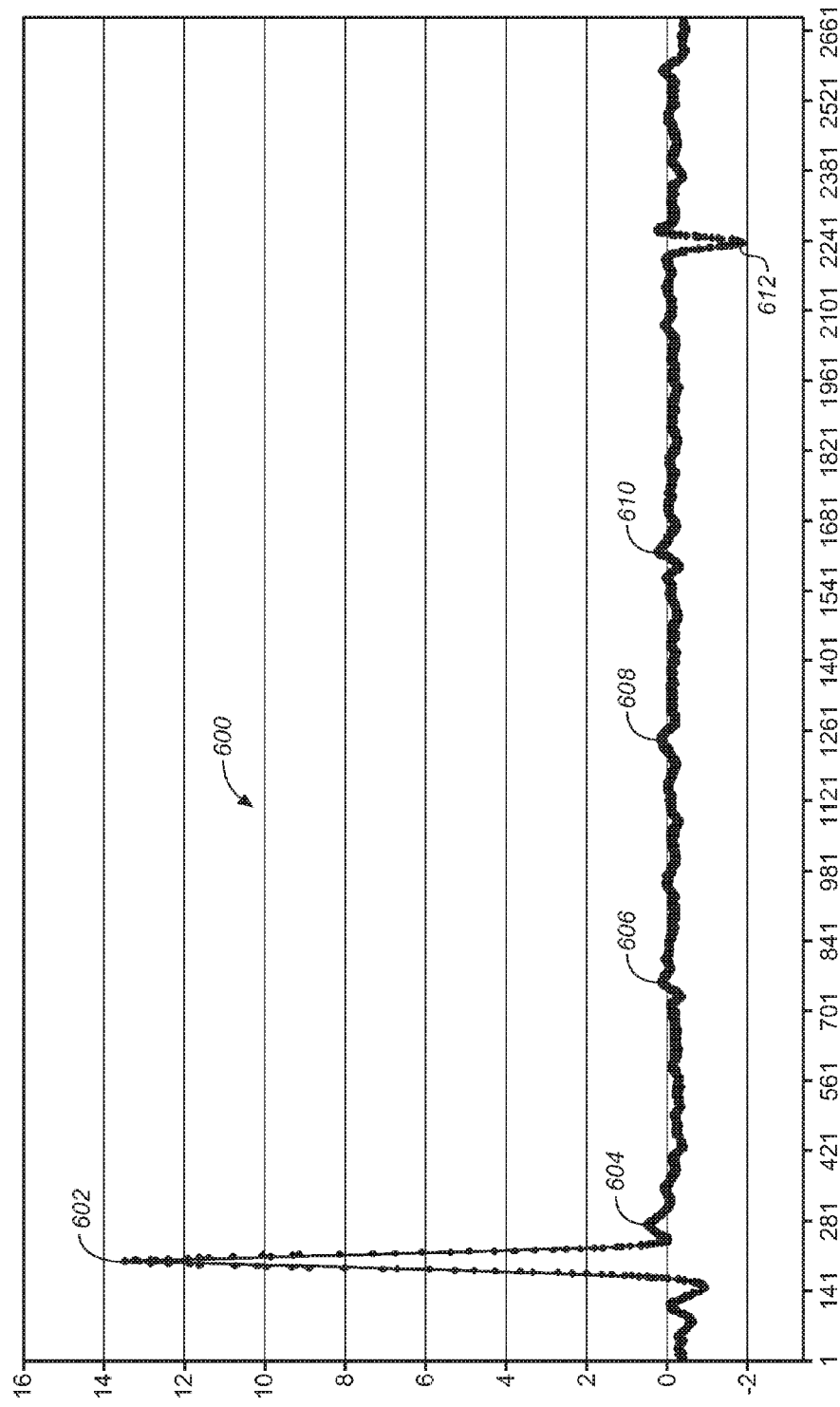
FIG. 6 is a graph illustrating a complete oversampled dibit response from a storage system, such as the storage system illustrated in FIG. 1, where the dibit response includes a main lobe with echoes in accordance with an example embodiment of the present disclosure.
Figure 7:
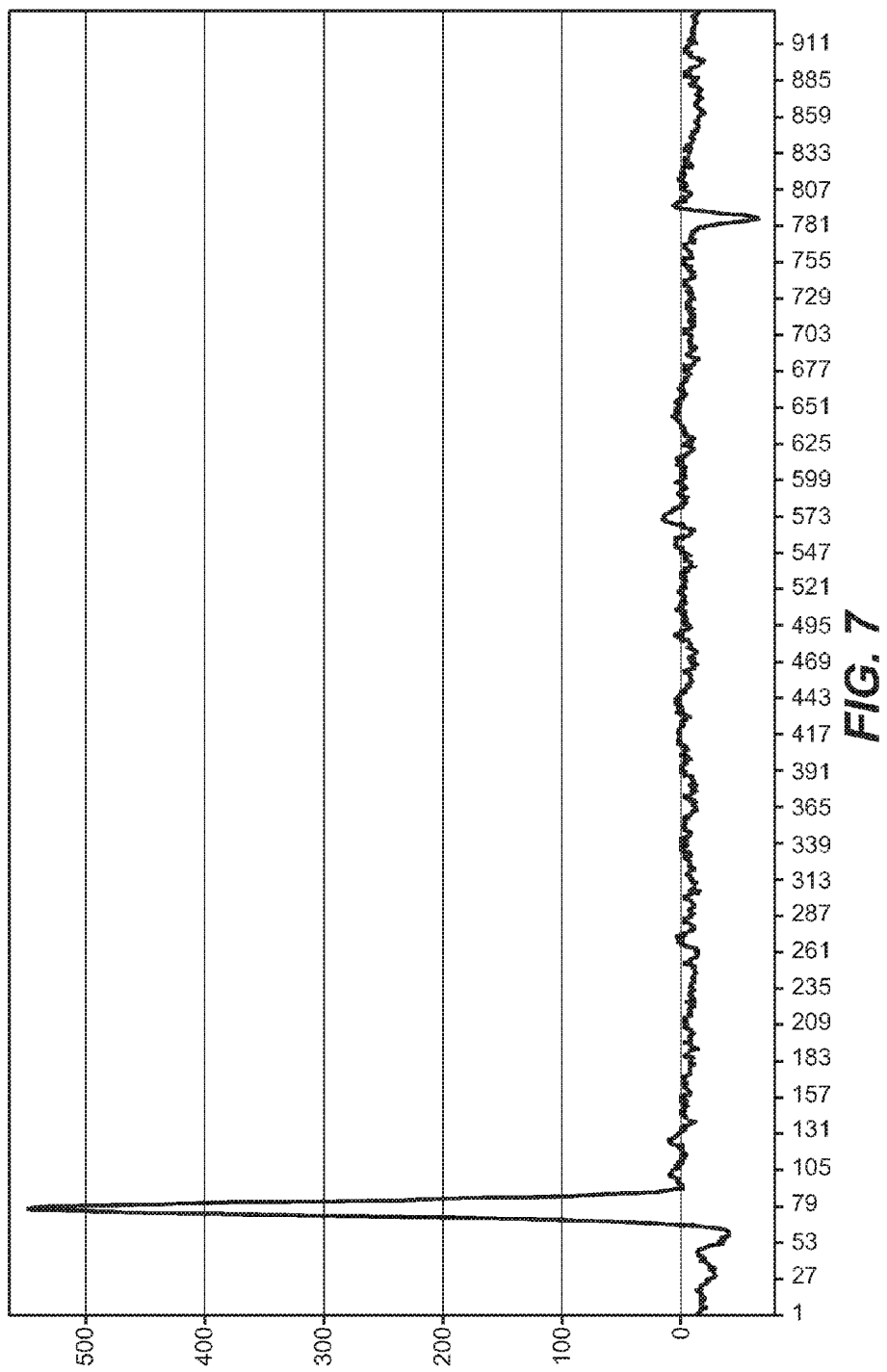
FIG. 7 is a graph illustrating a dibit captured from a storage system, such as the storage system illustrated in FIG. 1, where the dibit was captured using an oscilloscope in accordance with an example embodiment of the present disclosure.
Figure 8:
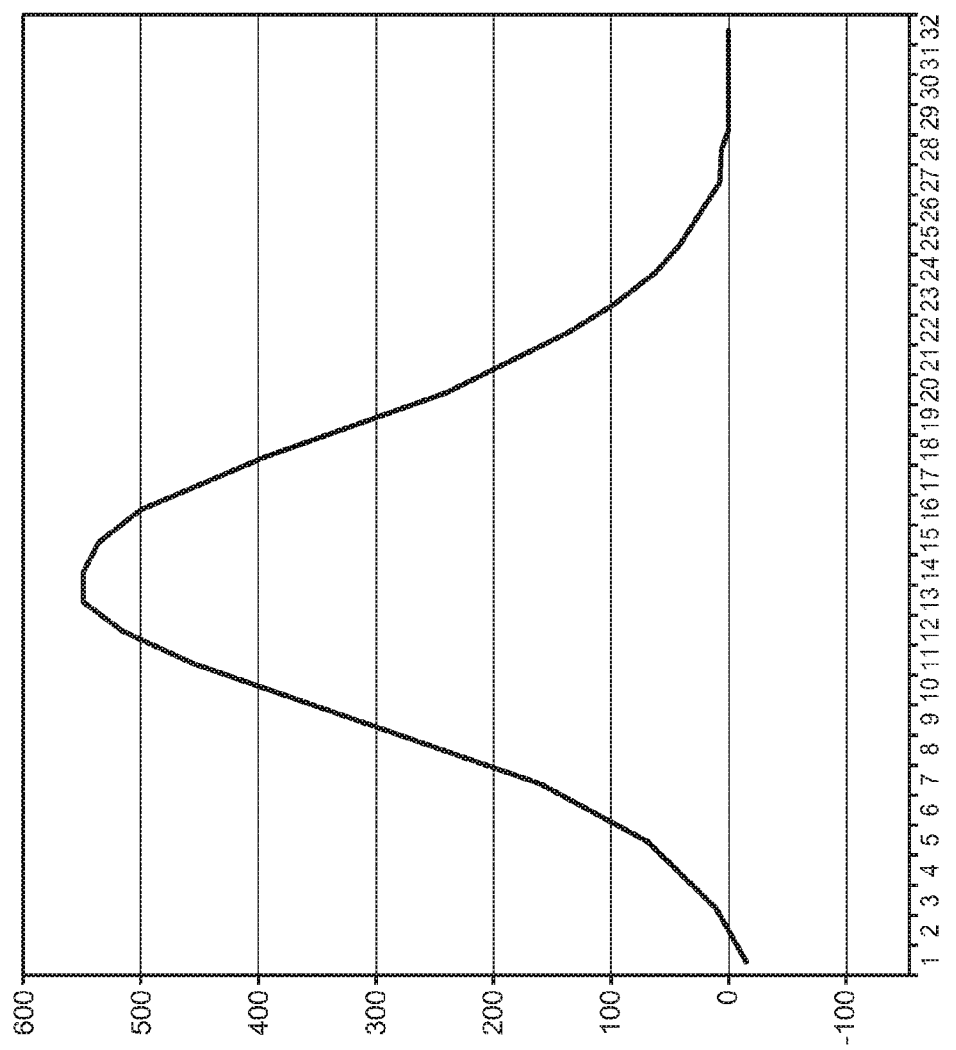
FIG. 8 is an enlarged portion of the graph illustrated in FIG. 7.
Figure 9:
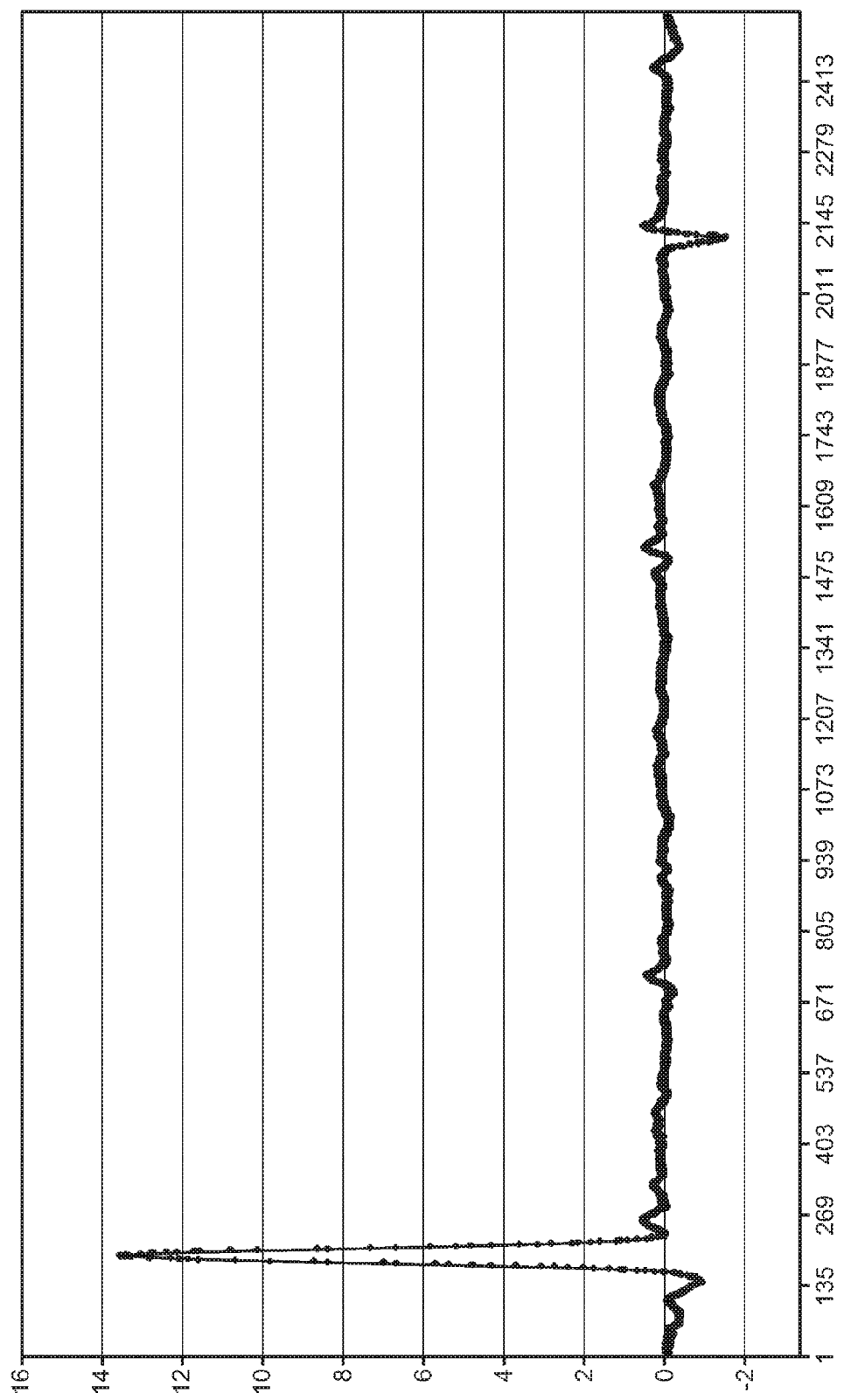
FIG. 9 is a graph illustrating a dibit captured from a storage system, such as the storage system illustrated in FIG. 1, where the dibit was captured using a multiple target sweep in accordance with an example embodiment of the present disclosure.
Figure 10:
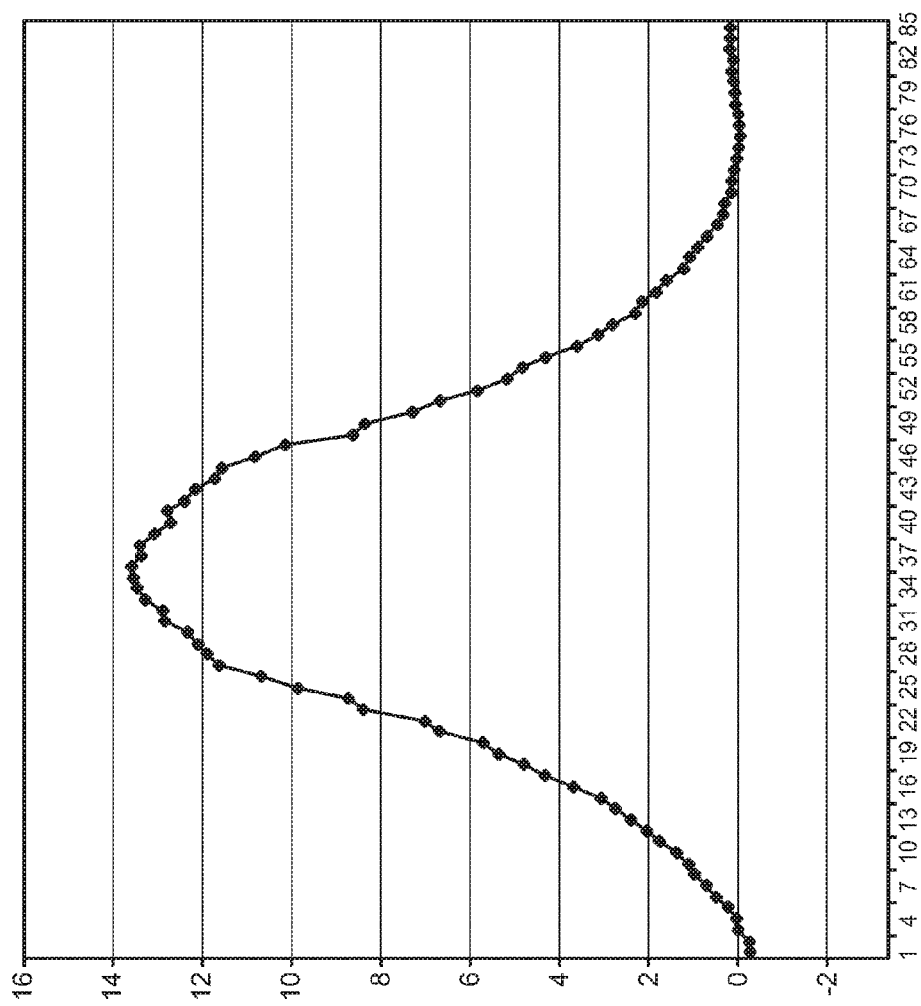
FIG. 10 is an enlarged portion of the graph illustrated in FIG. 9.

In some embodiments, the multiple captured waveforms are interleaved to form a dibit response (Block 1142). For example, twenty dibit captures spaced apart at Tr/20 are combined to form an interleaved dibit response (e.g., as shown in FIGS. 6, 9, and 10). In some embodiments, a dibit response is calculated using a combined waveform. In other embodiments, a dibit response is generated by calculating a dibit response for each of the multiple captured waveforms, and then interleaving the dibit responses to form an oversampled waveform dibit response. In embodiments of the disclosure, a dibit response formed as described herein has a higher resolution (e.g., with respect to a typical dibit response). For example, a dibit response formed using twenty-times (20×) oversampling as described herein has a resolution twenty-times (20×) greater than a typical dibit response. In embodiments of the disclosure, the dibit response is used to extract one or more channel parameters for the magnetic storage medium including, but not necessarily limited to: NLTS, HTS, MRA, CBD, and so forth. With reference to FIG. 6, an example waveform illustrating a dibit response 600 with echoes due to nonlinearities is depicted. FIG. 6 shows the main dibit response 602 along with nonlinear echoes 604, 606, 608, 610, 612, and so forth. The vertical axis represents the amplitude of the dibit response signal (e.g., in volts), and the horizontal axis represents the discrete time shifts of the PRBS sequence. The main dibit response 602 represents the linear response of the read channel.

Then, one or more of a nonlinearity and an amount of write pre-compensation for the magnetic storage medium is determined based upon the dibit response (Block 1144). For example, with continuing reference to FIGS. 1 through 10, the disk platter 114 is logically divided into separate regions (zones) and an amount of write pre-compensation is determined for each zone using the dibit response. In embodiments, the write pre-compensation is adjusted until an echo approaches a value of about zero (0). Further, in some embodiments one or more nonlinearities are adjusted until an echo approaches a value of zero (0).

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In embodiments of the disclosure that manifest in the form of integrated circuits, the various blocks discussed in the above disclosure can be implemented as integrated circuits along with other functionality. Such integrated circuits can include all of the functions of a given block, system, or circuit, or a portion of the functions of the block, system or circuit. Further, elements of the blocks, systems, or circuits can be implemented across multiple integrated circuits. Such integrated circuits can comprise various integrated circuits including, but not necessarily limited to: a system on a chip (SoC), a monolithic integrated circuit, a flip chip integrated circuit, a multichip module integrated circuit, and/or a mixed signal integrated circuit. In embodiments of the disclosure that manifest in the form of software, the various blocks discussed in the above disclosure represent executable instructions (e.g., program code) that perform specified tasks when executed on a processor. These executable instructions can be stored in one or more tangible computer readable media. In some such embodiments, the entire system, block or circuit can be implemented using its software or firmware equivalent. In some embodiments, one part of a given system, block or circuit can be implemented in software or firmware, while other parts are implemented in hardware.

Although embodiments of the disclosure have been described in language specific to structural features and/or methodological acts, it is to be understood that the subject matter defined in the appended claims is not necessarily limited to the specific embodiments described. Although various configurations are discussed, the apparatus, systems, subsystems, components and so forth can be constructed in a variety of ways without departing from teachings of this disclosure. Rather, the specific features and acts are disclosed as embodiments of implementing the claims.

What is claimed is:

1. A system for oversampling a signal captured from a magnetic storage medium, the signal representative of information stored by the magnetic storage medium, the system comprising:
   a processor configured to designate a first sampling phase for the signal and a second sampling phase for the signal; and
   a memory configured to store the first sampling phase and the second sampling phase, the memory having computer executable instructions stored thereon, the computer executable instructions configured for execution by the processor to:
   initiate capture of a first waveform associated with the signal at the first sampling phase,
   initiate capture of a second waveform associated with the signal at the second sampling phase, and
   interleave the first waveform and the second waveform to form an oversampled waveform, wherein the first waveform and the second waveform are captured at a rate at least substantially equal to a rate at which the information stored by the magnetic storage medium was written to the magnetic storage medium.

2. The system as recited in claim 1, wherein the computer executable instructions are configured for execution by the processor to initiate capture of a third waveform at a third sampling phase, and interleave the third waveform with the first waveform and the second waveform to form the oversampled waveform.

3. The system as recited in claim 2, wherein the first sampling phase, the second sampling phase, and the third sampling phase are at least substantially equally spaced apart.

4. The system as recited in claim 1, wherein the computer executable instructions are configured for execution by the processor to adjust the first sampling phase using a finite impulse-response filter.

5. The system as recited in claim 1, wherein the computer executable instructions are configured for execution by the processor to adjust the first sampling phase by designating a first target associated with the first sampling phase.

6. The system as recited in claim 1, wherein the computer executable instructions are configured for execution by the processor to interleave the first waveform and the second waveform to form a dibit response.

7. The system as recited in claim 6, wherein the computer executable instructions are configured for execution by the processor to determine at least one of a nonlinearity or an amount of write pre-compensation for the magnetic storage medium based upon the dibit response.

8. The system as recited in claim 1, wherein the system is fabricated in an integrated circuit.

9. A tangible computer-readable storage medium having computer executable instructions for oversampling a signal captured from a magnetic storage medium, the signal representative of information stored by the magnetic storage medium, the computer executable instructions comprising:
   designating a first sampling phase for the signal;
   capturing a first waveform associated with the signal at the first sampling phase;
   designating a second sampling phase different from the first sampling phase for the signal;
   capturing a second waveform associated with the signal at the second sampling phase; and
   interleaving the first waveform and the second waveform to form an oversampled waveform, wherein the first waveform and the second waveform are captured at a rate at least substantially equal to a rate at which the information stored by the magnetic storage medium was written to the magnetic storage medium.

10. The tangible computer-readable storage medium as recited in claim 9, wherein the computer executable instructions further comprise:
    designating a third sampling phase different from the first sampling phase and the second sampling phase for the signal;
    capturing a third waveform associated with the signal at the third sampling phase; and
    interleaving the third waveform with the first waveform and the second waveform to form the oversampled waveform.

11. The tangible computer-readable storage medium as recited in claim 10, wherein the first sampling phase, the second sampling phase, and the third sampling phase are at least substantially equally spaced apart.

12. The tangible computer-readable storage medium as recited in claim 9, wherein the computer executable instructions further comprise adjusting the first sampling phase using a finite impulse-response filter.

13. The tangible computer-readable storage medium as recited in claim 9, wherein the computer executable instructions further comprise adjusting the first sampling phase by designating a first target associated with the first sampling phase.

14. The tangible computer-readable storage medium as recited in claim 9, wherein the computer executable instructions further comprise interleaving the first waveform and the second waveform to form a dibit response.

15. The tangible computer-readable storage medium as recited in claim 14, wherein the computer executable instructions further comprise determining at least one of a nonlinearity or an amount of write pre-compensation for the magnetic storage medium based upon the dibit response.

16. A computer-implemented method for oversampling a signal captured from a magnetic storage medium to form a dibit response, the signal representative of information stored by the magnetic storage medium, the computer-implemented method comprising:
    designating a first sampling phase for the signal;
    capturing a first waveform associated with the signal at the first sampling phase;
    designating a second sampling phase different from the first sampling phase for the signal;
    capturing a second waveform associated with the signal at the second sampling phase; and
    causing a processor to interleave the first waveform and the second waveform to form a dibit response, wherein the first waveform and the second waveform are captured at a rate at least substantially equal to a rate at which the information stored by the magnetic storage medium was written to the magnetic storage medium.

17. The computer-implemented method as recited in claim 16, fluffier comprising:
    designating a third sampling phase different from the first sampling phase and the second sampling phase for the signal;

capturing a third waveform associated with the signal at the third sampling phase; and causing the processor to interleave the third waveform with the first waveform and the second waveform to form the dibit response.

18. The computer-implemented method as recited in claim 17, wherein the first sampling phase, the second sampling phase, and the third sampling phase are at least substantially equally spaced apart.

19. The computer-implemented method as recited in claim 16, further comprising adjusting the first sampling phase using a finite impulse-response filter.

20. The computer-implemented method as recited in claim 16, further comprising determining at least one of a nonlinearity or an amount of write pre-compensation for the magnetic storage medium based upon the dibit response.

* * * * *